United States Patent Office 2,752,258
Patented June 26, 1956

2,752,258

SILICON NITRIDE-BONDED SILICON CARBIDE REFRACTORIES

John P. Swentzel, Niagara Falls, N. Y., assignor to The Carborundum Company, Niagara Falls, N. Y., a corporation of Delaware No Drawing. Application March 2, 1955, Serial No. 491,781

4 Claims. (Cl. 106—44)

This invention relates to silicon nitride-bonded silicon carbide material and articles composed thereof. It also pertains to compositions and methods of making said materials and articles.

This application is a continuation-in-part of application Serial No. 11,356 filed February 26, 1948, now abandoned.

Silicon carbide is generally reserved for the making of refractories which are to be used under severe operating conditions where the temperature is extremely high, the fluctuations in temperature are abnormally great, the requirements of mechanical strength at elevated temperatures are excessive, and/or the corrosive and erosive conditions of use are severe in one or more respects. The high thermal conductivity of silicon carbide also makes it an ideal material for certain refractory applications, as for example, where rapid heat transfer is desired. The superiority of bonded silicon carbide refractories over the more inexpensive fire clay products has justified the added cost of using silicon carbide products in many cases. Considerable attention has been paid therefore to ways of taking the best possible advantage of the extremely refractory properties and qualities of the silicon carbide particles by the use therewith of bonding materials which are themselves of sufficient refractoriness that they do not materially detract from the satisfactoriness of the silicon carbide material. In spite of the extensive activity in this direction the full benefits to be derived from the highly refractory, resistant character of the silicon carbide itself have never been realized.

Heretofore efforts to produce a bond for silicon carbide particles which would have an extremely high strength at elevated temperatures and would be resistant to substantial fluctuations in temperature and at the same time would be satisfactorily resistant to oxidation have been only partially successful. Clays and other ingredients producing bonds of the porcelain type have resulted in bodies which have had good hot strength, but which are not sufficiently oxidation-resistant to give a satisfactory life. Other silicon carbide bodies using bonds of a glassy nature have been fairly resistant to oxidation, only to fail at operating temperatures because of softening of the glass bond and loss of strength. Attempts to improve the properties of such articles by the application of various glazes to the formed article or by the incorporation of glaze-developing materials within the body of the article as a component of the bonding material have not been entirely successful, sometimes because of the temporary character of the glaze and in other instances because of the tendency of the glaze to cause staining or discoloration of articles coming in contact with the refractory during use at high temperatures. Such disadvantages have greatly limited the range or field of use in which bonded silicon carbide refractories have been capable of application.

A high resistance to spalling as well as a fairly high strength at elevated temperatures has led also to the use of coke residue bonds in spite of the fact that such bonds are even more susceptible to rapid oxidation and destruction than is silicon carbide. Regardless of the type of bond heretofore used each one has had some specific disadvantage to limit its field of application or appreciably shorten its useful life.

It is an object of the present invention to provide an improved bonded silicon carbide material or body which will stand up under heavy loads at high temperatures.

It is a further object to provide a bonded silicon carbide body which is highly resistant to heat shock or rapid fluctuations in temperatures.

It is a still further object to provide a bonded silicon carbide article in which the bond as well as the silicon carbide component is of a refractoriness considerably above that of such common bonding materials as glass, porcelain and the like.

It is a further object to provide a bonded silicon carbide article which, in addition to possessing the aforesaid properties, will be sufficiently resistant to oxidation to permit its continued use at temperatures as high as 1450° C. and even higher.

It is a still further object to provide a silicon carbide material or body that avoids the disadvantages of prior practice.

In accordance with the present invention, bonded silicon carbide materials or articles in which the silicon carbide grains are held together by a silicon nitride bond are formed. The bonding of the silicon carbide grains by silicon nitride is obtained in accordance with the present invention by intimately mixing silicon of the required degree of fineness with the silicon carbide grains and moistening to form a moldable mixture and molding the desired mass or shape from the resulting mixture of silicon and silicon carbide, drying the thus formed material and firing it in a non-oxidizing, nitrogenous atmosphere at a temperature and period of time sufficient to convert substantially all the silicon metal to silicon nitride.

I have found that the resulting products, when the nitriding operation has been effectively carried out to bring about a thorough nitriding of the silicon constituent as hereinafter more fully described, have unexpectedly outstanding properties heretofore unattained in refractory bodies. However, it is essential for the attainment of these superior qualities that the silicon be substantially fully converted to silicon nitride.

I have found that highly satisfactory results are to be obtained by using commercial grade silicon ground to suitable fineness. Analysis of a commercial grade of silicon which I have satisfactorily used in carrying out the present invention discloses, in addition to the silicon, the presence of the following impurities:

| | Per cent |
|---|---|
| Iron | 0.87 |
| Chromium | 0.21 |
| Aluminum | 0.60 |
| Calcium | 0.54 |

In order to obtain a satisfactory conversion of the silicon to silicon nitride within a reasonable period of time when a commercial grade silicon powder of the above type is used the silicon should be fine enough to pass through a screen of around 200 mesh size (U. S. Standard sieve) and finer, which is around 70 to 90 microns in particle size. Still more rapid nitriding is obtained when the silicon is of a fineness in the neighborhood of 20 microns and finer. Satisfactory conversion of the silicon to silicon nitride bond also has been obtained with pure silicon (99.8% silicon), although it has been found that when the pure form of silicon is used, the period of time required for nitriding is much longer than that required for nitriding articles of similar size and shape formed of commercial grade silicon of the same degree of fineness provided the other conditions of the nitriding operation are the same. The rate of conversion of the silicon to silicon nitride when pure silicon is used can be increased by a reduction of the silicon to a finer particle size. It also has been found that the rate of conversion of the pure form of silicon to silicon nitride can be increased by adding a small percentage of iron powder, say, in the neighborhood of ¾% to 2% by weight, which is the amount commonly found in commercial grade silicon, to the pure silicon. The greater ease of conversion of the silicon to silicon nitride when commercial grade silicon containing the aforementioned impurities is used as compared with the nitriding action obtained with pure silicon is to be attributed, therefore, to the presence of the small amount of iron impurity commonly found in the commercial grade of silicon metal.

I have made an exhaustive study of the effect of the particle size of the silicon used in the herein-described process to form silicon nitride-bonded silicon carbide refractories and have found that in order to obtain a satisfactory conversion of the silicon to silicon nitride and thereby obtain an acceptable bonding of the silicon carbide particles with resultant outstanding refractory properties that the silicon must be at least 200 mesh (U. S. Standard sieve) and finer and that unless this limitation as to particle size is recognized and followed a reasonably complete or acceptable degree of conversion to the nitride does not take place as is shown by Table I below.

It is found by analysis of the bonding constituent in satisfactorily bonded silicon carbide material or articles of the present invention that the bond analyzes very closely to the empirical formula $Si_3N_4$, which represents a theoretical composition of 60.04% silicon and 39.96% nitrogen. It therefore is reasonable to assume that the bond in the bonded silicon carbide bodies made in accordance with the present invention has been formed according to the following chemical reaction and consists substantially entirely, except for impurities or other added ingredients, of silicon nitride having the formula $Si_3N_4$.

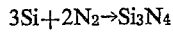

$$3Si + 2N_2 \rightarrow Si_3N_4$$

The theoretical gain in weight in converting silicon metal to silicon nitride having the formula $Si_3N_4$ is 66.67%. Therefore, upon complete conversion of the silicon to silicon nitride the article theoretically should gain in weight an amount equal to 66.67% of the weight of the silicon metal content of the unfired article. Actual experience has shown that silicon carbide bodies bonded by silicon nitride and formed in accordance with the teachings herein undergo a gain in weight of 55% or more of the weight of the silicon content in the unfired article and usually show a gain in weight of around 60% of the weight of the silicon in the article. It is suspected that the entire theoretical gain in weight is not attained because of the loss of some silicon by volatilization during the nitriding step, the amount lost being estimated to be in the neighborhood of 4%. In calculating the amount of conversion from silicon to silicon nitride it is necessary also to take into consideration and make compensation for any loss in weight during firing caused by the volatilization of temporary binders, if such have been used.

Using the gain in weight as a gauge of the degree of conversion to silicon nitride by nitriding with various mixtures, it has been definitely established that articles formed with coarse granular silicon metal as the source of the bonding constituent cannot be nitrided readily or thoroughly and that, in order to obtain a reasonably complete conversion of the silicon metal to silicon nitride, all of the silicon should go through a 200 mesh U. S. Standard sieve and have a range of particle size from the maximum size that will go through the 200 mesh sieve, which is around 70 to 90 microns particle size, down to colloidal size particles. In fact, best results are to be obtained by further pulverizing 200 mesh size silicon metal until at least a major portion of the material ranges from 20 microns individual particle size down to colloidal size particles prior to use. Table I below shows to some extent the effect of the particle size of the silicon contained in the mixture from which an article or mass is formed upon the degree of nitriding obtained when the conversion is carried on in a stream of nitrogen at temperatures of 1300–1400° C. for a total of seven hours.

TABLE I

| Fineness of Silicon | Percent Gain in Weight in 3½ Hours | Percent Gain in Weight During Second 3½ Hours | Total Percent Gain in Weight in 7 Hours |
| --- | --- | --- | --- |
| 10 Microns and finer | 58.3 | ---------- | 58.3 (in 3½ hrs.). |
| 200 Mesh and finer | 18.1 | 20.5 | 38.6. |
| 180 Mesh and finer | 27.3 | 2.15 | 29.45. |
| Through 80 and on 180 mesh | 3.27 | 0.77 | 4.04. |
| 80 Grit size | 2.84 | −0.97 | 1.87. |

Thorough conversion of the silicon to silicon nitride in the nitriding operation is also shown by the electrical resistance characteristics of the resulting body. Bodies in which substantially all the silicon has been converted to silicon nitride as shown by a gain in weight of at least 55% based on the weight of the silicon in the body, have very high electrical resistances, the specific electrical resistance depending upon the ratio of silicon carbide to silicon nitride bond. For example, a silicon carbide body made up of as much as 84 parts by weight of silicon carbide and 16 parts by weight of silicon when thoroughly nitrided has a specific resistance at room temperature in the order of magnitude of 21 ohms per cubic centimeter, a similar fully nitrided body made from 70 parts of silicon carbide and 30 parts by weight of silicon has an electrical resistance at room temperature of 750 to 1050 ohms per cubic centimeter, and a silicon carbide body made from 50 parts of silicon carbide and 50 parts by weight of silicon has an electrical resistance at room temperature around $5 \times 10^8$ ohms per cubic centimeter. Minor differences in the electrical resistance occur with the use of small amounts of different temporary binders. Such bodies also have markedly high hot strengths, retaining the predominant part of their cold strengths at temperatures of 1450° C. and above, and possess exceptional refractory qualities which make them outstanding for use in such severe applications as lining materials for jet and rocket motors, nozzles and the like. By contrast, bodies made of the same raw batches in which the nitriding is incomplete, leaving substantial amounts of unconverted elemental silicon in the body are entirely different in electrical resistance characteristics, being more in the nature of semi-conductors of the type used for electrical resistance heating elements, and do not possess the unusual refractory properties of the fully nitrided bodies of the present invention.

To demonstrate the marked difference in properties of bodies in which thorough nitriding has not been effected, a number of bodies were prepared from the following two compositions and fired under nitriding conditions at different temperatures and times, the extent to which nitriding had been accomplished determined by measuring the change in weight during the firing operation, the specific electrical resistance measured, and the hot and cold strengths determined. Table II below presents the results of this comparison. As can readily be seen, those bodies in which only partial nitriding took place, leaving a substantial amount of residual unconverted silicon in the fired body, namely, the bodies fired for 1 hour at 1000° C. and the bodies fired for 12 hours at 1100°

C., had an entirely different electrical resistance property and lost most of their strength at high temperatures.

|  | Composition A, Parts by Weight | Composition B, Parts by Weight |
|---|---|---|
| 14–36 mesh grit size silicon carbide | 40 | 40 |
| 80 and finer grit size silicon carbide | 30 | 30 |
| 200 and finer grit size silicon | 30 | 30 |
| Goulac | 3 | 5 |
| Bentonite gel (1 part bentonite to 4 parts water) | 4 | 0 |

TABLE II

| Nitriding Treatment Fired in Nitrogen Atmosphere | 1 hour @ 1,000° C. | | 12 hours @ 1,100° C. | | 7½ hours @ 1,400° C. | |
|---|---|---|---|---|---|---|
|  | Comp. A | Comp. B | Comp. A | Comp. B | Comp. A | Comp. B |
| Physical properties: |  |  |  |  |  |  |
| Electrical resistance, ohms/cubic cm | 5.7 | 2.0 | 19.8 | 4.6 | 1,050 | 750 |
| Modulus of Rupture (pounds per square inch) Room Temperature | 1,550 | 1,300 | 5,250 | 2,650 | 6,200 | 4,500 |
| Modulus of Rupture (pounds per square inch) at 1,450° C | >70 | >70 | 1,250 | 400 | 5,700 | 4,000 |
| Loss in Strength, percent $\left(\frac{\text{MR @ Room Temperature}-\text{MR @ 1,450° C}}{\text{MR @ Room Temperature}} \times 100\right)$ | >95 | >94 | 76 | 85 | 8 | 12 |
| Change in weight during firing, percent | −0.9 | −1.4 | +5.9 | +1.8 | +15 | +12.8 |
| Gain Based on Weight of Silicon, percent | 3.9 | 5.6 | 27.3 | 16.8 | 58.8 | 55.3 |

I have also found it to be desirable in the making of large or bulky shapes to incorporate a small amount of bentonite in the raw batch in order to obtain a mixture of suitable molding consistency in which the silicon is uniformly distributed throughout the mass.

In order that the invention may be more fully understood the following specific examples are submitted for illustrative purposes and indicate the manner in which silicon carbide articles bonded by silicon nitride can be formed in accordance with the practices and principles of the present invention.

EXAMPLE I

Silicon carbide setter tile 14" x 15" x ½" and 14" x 15" x 1" have been molded from the following composition:

| | Parts by weight |
|---|---|
| 14–36 mesh size silicon carbide grain | 48 |
| 80 mesh and finer silicon carbide grain | 36 |
| 200 mesh size and finer silicon powder | 16 |
| Dry lignone | 5 |
| Bentonite gel | 6 |

The above ingredients, with the exception of the bentonite gel, are dry mixed in a tumbling barrel for 15 minutes to insure good blending, after which they are wet mixed for an additional 20 minutes in a kneader mixer. The mix is wet to the proper pressing consistency with the bentonite gel which is made of 4 parts of water and 1 part dry bentonite powder. The bentonite gel serves to take up the finely divided silicon powder, which is otherwise very fluffy and extremely difficult to handle, and distribute it evenly and uniformly throughout the molding mixture and provide a well blended batch of suitable consistency for molding.

The tile are formed by pressing in a hydraulic press at a pressure of 5000 pounds per square inch. The dried articles are then placed in a muffle furnace and the normal atmosphere in the muffle is replaced by a continuous stream of commercial grade nitrogen having a purity of 99.7%, after which the temperature of the furnace chamber is raised in accordance with standard ceramic firing practice to 1400° C. and held at that temperature for 12 hours, while a continuous stream of nitrogen is fed into the furnace muffle. The furnace with the nitrogen still flowing is allowed to cool to room temperature or to a temperature convenient for handling the tile whereupon they are removed from the furnace ready for use. Such tile are highly suitable to use in kilns for the firing of white ware and the like and have the advantageous feature of not staining the ware coming in contact with the tile.

It is of interest to note that there is no change in the volume of the articles as a result of the firing operation. It is found upon weighing the molded and dried articles before and after the firing operation that they undergo a gain in weight of approximately 5–6%, which, if calculated on the basis of the silicon content of the article, and corrected for loss of volatile matter, indicates a gain in weight of the silicon bond of around 64%, thereby indicating that there has been a substantially complete conversion of the silicon in the raw batch to the silicon nitride in the finished article.

The modulus of rupture of silicon carbide articles made in accordance with the composition and procedure set forth in Example I above is found to be in excess of 6700 pounds per square inch at 1350° C. This figure is approximately twice the strength at that temperature of high grade bonded silicon carbide refractories heretofore on the market.

Other silicon nitride bonded silicon carbide bodies in accordance with the present teachings have been made in which the modulus of rupture at 1350° C. has been in the neighborhood of 10,000 pounds per square inch.

Table III below shows for purposes of comparison the normal moduli of rupture at 1350° C. for various conventionally bonded silicon carbide and other refractory bodies and clearly demonstrates the remarkable and totally unexpected hot strength properties of the present products.

TABLE III

Modulus of rupture—pounds per square inch at 1350° C.

| Nature of Refractory Body | Type of Bond | Modulus of Rupture, lbs/sq. in. |
|---|---|---|
| Silicon carbide | Silicon nitride | 6,700. |
| Do | Clay | 1,600. |
| Do | SiC fines | 2,700. |
| Do | Clay | 900. |
| Do | Partially nitrided silicon | 400 to 1,250 [1]. |
| Fused alumina | Clay | 500. |
| Fused mullite | do | 400. |

[1] Modulus of rupture at 1,450° C.

Table IV below shows the marked superiority of bonded silicon carbide articles made in accordance with the present invention in respect of resistance to heat shock. Tests were conducted by placing the tile under a fixed load in a furnace and raising the temperature by the indicated number of degrees per hour to 600° C., after which the furnace was allowed to cool and the tile were removed from the furnace and their condition noted. It has been my experience with bonded silicon carbide refractories that if the article is going to crack because of heat shock it will do so at a temperature considerably below 600° C. If a tile is found to have come through the test without cracks and without having pulled apart it is put back into the furnace and reheated to 600° C. at a rate 25° C. per hour higher than the rate of increase of the previous cycle. The tile is again inspected and its condition noted. This operation is repeated at increasing rates of temperature rise until failure through cracking or pulling apart of the tile takes place. Comparative tests on tiles made in accordance with the present invention and tiles made with partially nitrided bonds show the unusual and unexpected superiority of the tiles of the present invention. A comparison of tiles made in accordance with the present invention and standard commercial tile is set forth in the table wherein it will be noted that tile made in accordance with the present invention, whether of ½″ or 1″ thickness, survived a rate of temperature increase of 500° C. per hour without damage whereas tile representative of the highest grade available commercially prior to the present invention failed from heat shock caused by heating the tile to 600° C. at a rate of 250–300° C. per hour.

(which is silicon carbide powder of impalpable fineness), the silicon powder and lignone are first dry-mixed thoroughly, then admixed dry with the balance of the silicon carbide, and finally mixed in an ordinary kneader mixer with sufficient water to bring the mix to a pressure molding consistency. Bricks, 9″ x 4½″ x 1¼″ in size, commonly known in the trade as "splits," are then formed by pressing in a hydraulic press at 6200 pounds per square inch. The shaped articles are then dried in the usual manner at 220° F. and placed in an atmosphere of nitrogen and raised to and fired at 1400° C. for 12 hours in the same manner set forth in further detail under Example I above, after which they are allowed to cool, and are then ready for use.

Bonded silicon carbide splits so made when tested for strength at 1350° C. have a modulus of rupture of over 2500 pounds per square inch, it not being unusual to obtain strengths as high as 6700 pounds per square inch. Splits made according to Example II when subjected to a spalling test in which each cycle of the test consisted of heating the bricks to 1300° C. at one end, withdrawing them from the furnace and exposing them without delay to a blast of cold air, withstood 6 cycles before cracking.

TABLE IV

*Condition of tile*

| Tile No. | Tile Size | Tile Composition | Rate of Increase in Temperature in °C. per hour | | | | | | | | | | |
|---|---|---|---|---|---|---|---|---|---|---|---|---|---|
| | | | 250 | 275 | 300 | 325 | 350 | 375 | 400 | 425 | 450 | 475 | 500 |
| 1 | 14″x15″x½″ | Silicon nitride bond, As per Ex. I. | | | | | O.K. | O.K. | O.K. | O.K. | O.K. | O.K. | O.K. |
| 2 | ---do--- | ---do--- | | | | | O.K. | O.K. | O.K. | O.K. | O.K. | O.K. | O.K. |
| 3 | ---do--- | ---do--- | | | | | O.K. | O.K. | O.K. | O.K. | O.K. | O.K. | O.K. |
| 4 | ---do--- | ---do--- | | | | | O.K. | O.K. | O.K. | O.K. | O.K. | O.K. | O.K. |
| 5 | ---do--- | ---do--- | | | | | O.K. | O.K. | O.K. | O.K. | O.K. | O.K. | O.K. |
| 6 | ---do--- | ---do--- | | | | | O.K. | O.K. | O.K. | O.K. | O.K. | O.K. | O.K. |
| 7 | 14″x15″x½″ | ---do--- | | | | | O.K. | O.K. | O.K. | O.K. | O.K. | O.K. | O.K. |
| 8 | ---do--- | ---do--- | | | | | O.K. | O.K. | O.K. | O.K. | O.K. | O.K. | O.K. |
| 9 | ---do--- | ---do--- | | | | | O.K. | O.K. | O.K. | O.K. | O.K. | O.K. | O.K. |
| 10 | ---do--- | ---do--- | | | | | O.K. | O.K. | O.K. | O.K. | O.K. | O.K. | O.K. |
| 11 | ---do--- | ---do--- | | | | | O.K. | O.K. | O.K. | O.K. | O.K. | O.K. | O.K. |
| 12 | ---do--- | ---do--- | | | | | O.K. | O.K. | cracked | cracked | cracked | cracked | cracked |
| 13 | 14″x15″x½″ | Standard High grade commercial tile, Composition A. | O.K. | O.K. | pulled apart. | | | | | | | | |
| 14 | ---do--- | ---do--- | pulled apart. | | | | | | | | | | |
| 15 | ---do--- | ---do--- | ---do--- | | | | | | | | | | |
| 16 | ---do--- | ---do--- | cracked | cracked | pulled apart. | | | | | | | | |
| 17 | ---do--- | ---do--- | pulled apart. | | | | | | | | | | |
| 18 | ---do--- | ---do--- | O.K. | cracked | pulled apart. | | | | | | | | |
| 19 | 14″x15″x¾″ | Standard High grade commercial tile, Composition B. | O.K. | O.K. | O.K. | O.K. | broke | | | | | | |
| 20 | ---do--- | ---do--- | O.K. | O.K. | O.K. | cracked | cracked | cracked | cracked | cracked | cracked | | |
| 21 | ---do--- | ---do--- | O.K. | O.K. | O.K. | O.K. | O.K. | broke | | | | | |
| 22 | ---do--- | ---do--- | O.K. | O.K. | O.K. | O.K. | cracked | cracked | cracked | cracked | cracked | | |
| 23 | ---do--- | ---do--- | O.K. | O.K. | O.K. | O.K. | broke | | | | | | |
| 24 | ---do--- | ---do--- | O.K. | O.K. | O.K. | cracked | cracked | cracked | cracked | cracked | pulled apart. | | |

EXAMPLE II

Example II illustrates a mix within the scope of the present invention suitable for making refractory shapes such as bricks and the like where a prime requisite is high strength at elevated temperatures and a relatively high degree of resistance to oxidation.

Parts by weight
14 mesh and finer silicon carbide grain _____ 70
Colloidal silicon carbide _____ 10
200 mesh and finer commercial grade silicon powder _____ 20
Dry lignone _____ 3

The silicon carbide grain is selected in a gradation of grit sizes such as to produce a maximum density, all of said grains of such size as to pass through a 14 mesh (U. S. Standard sieve) screen. The colloidal silicon carbide The same kind of nitride bonded silicon carbide bodies when exposed to an accelerated oxidation test showed the following gain in weight, the gain in weight being an indication of failure through oxidation of the silicon carbide to silica.

*Percentage gain in weight*

| 1st 3 weeks of heat | 2nd 3 weeks | 3rd 3 weeks | 4th 3 weeks |
|---|---|---|---|
| 4.5 | .23 | 0.0 | 0.0 |

As shown above, after an initial gain in weight the refractory body shows very little additional change, which is an indication that once having become stabilized there is very little further change due to oxidation. Standard high grade commercial bonded silicon carbide bodies when subjected to the same oxidation test tend to continue to gain in weight throughout the additional weeks of the test, and this indicates that the body is constantly undergoing deterioration through oxidation.

EXAMPLE III

Laboratory ware, such as combustion boats, crucibles, and the like, are made in accordance with the principles and practices of the present invention as follows:

| | Parts by weight |
|---|---|
| 220 mesh grit size silicon carbide | 50 |
| Pulverized silicon | 50 |
| Bentonite | 2 |

The pulverized silicon powder is obtained by grinding commercial grade 200 mesh and finer silicon until the major part of the silicon particles have a particle size of up to 20 microns. A typical analysis of silicon powder which has been suitably ground is the following:

| | Per cent |
|---|---|
| Up to 10 microns | 52 |
| 10–20 microns | 18 |
| 20–30 microns | 12 |
| 30–40 microns | 10 |
| 40–90 microns | 8 |

After thorough mixing of the aforementioned ingredients sufficient water is added to render the mix of slip casting consistency. The resulting slip is poured into a plaster of Paris mold in accordance with standard slip casting procedure to form crucibles, combustion boats and similar articles of the desired shape. The slip cast articles are removed from the mold and dried after which they are placed in the muffle of a furnace in which the normal atmosphere in the muffle has been replaced by nitrogen gas. The temperature of the furnace chamber is raised, as in Example I above, to 1400° C. and held at that temperature for seven hours while a constant flow of nitrogen into the furnace muffle is maintained. The furnace is allowed to cool while the atmosphere of nitrogen is maintained, whereupon the articles are removed from the furnace ready for use. Shapes made in the described manner are highly resistant to thermal shock, are extremely dense and impervious and have an extraordinarily high strength. For example, small bars thus made show a modulus of rupture at room temperature of over 10,000 pounds per square inch. The silicon nitride-bonded silicon carbide articles so made can be heated to temperatures in the neighborhood of 900° C. and plunged immediately into cold water without damage.

While I have described in the above examples the making of various molded shapes in which the article is molded and nitrided in the exact shape and form in which it is intended for use, the present invention is not so restricted. Another way of making and using silicon nitride-bonded silicon carbide bodies of the present invention is to mold the raw batch of material into briquettes or other shapes or otherwise compress a mass of the material having a composition the same as or similar to those given earlier herein for making the articles of the specified examples, after which the resulting compressed bodies are nitrided in the manner already described. After removal from the furnace, they are crushed to granular form of the desired grit size. The resulting granular material can then be used in loose granular form as a high temperature insulation material; for example, as insulation around jet engines and rocket combustion chambers, or as a layer of insulation around industrial furnace chambers. It may also be used as a loose filtering media or as a catalyst or catalyst carrier material. The granular material also can be bonded by means of sintered metals, vitreous or ceramic bonds or other bonding materials to form articles suitable for many of the industrial uses set forth elsewhere herein.

Although nitrogen gas having a purity of 99.7% has been mentioned for use in the examples set forth above, similar results can be obtained by the use of other non-oxidizing atmospheres containing nitrogen. For example, commercial annealing hydrogen, which has an approximate analysis of 93% nitrogen and 7% hydrogen, or ammonia gas can be similarly used in place of nitrogen.

Although I have indicated a number of non-oxidizing, nitrogenous gases which can be used as a direct source of nitrogen during the nitriding operation by carrying out that reaction in a reaction chamber into which the nitrogenous gas is continuously passed, it is to be recognized that if desired the nitriding reaction can be effectively carried out in other manners providing that the atmosphere immediately adjacent and within the article being nitrided is maintained substantially non-oxidizing in character and providing an ample supply of nitrogen is furnished the article. For example, in firing bodies or molded shapes in which a silicon nitride bond is to be formed the body can be embedded in a suitable mixture of coke and sand and the article fired at the aforementioned temperatures. The silicon is converted to silicon nitride by the nitrogen of the air, which penetrates the embedding mixture and reacts with the silicon contained in the articles embedded therein. The coke of the embedding mixture combines with the oxygen of the air and forms carbon monoxide before the free oxygen has an opportunity to reach the articles being fired, so that the gases penetrating to the article are substantially a mixure of nitrogen and carbon monoxide. Under these conditions substantially all the silicon will combine with the nitrogen to form silicon nitride. Obviously, sufficient coke must be provided in the mixture to provide an excess of carbon, so that carbon monoxide will be formed rather than carbon dioxide, and so that no free oxygen will be present. The embedding material must be of sufficient quantity to function in the prescribed manner. As further assurance that an ample supply of oxygen-free nitrogen is freely available to each article being thus fired, each individual shape must be spaced from adjoining articles with ample intervening embedding material. Otherwise, satisfactory nitriding does not take place in a reasonable length of time.

Moreover, although specific temperatures or temperature ranges have been recited in the aforementioned examples for the nitriding operation, and best results, i. e., most efficient and thorough conversion of the silicon to silicon nitride are found to take place when the nitriding operation is performed at temperature ranges slightly below the melting point of silicon (1420° C.), as for example, 1350–1400° C., satisfactory nitriding has been obtained at temperatures as low as in the neighborhood of 1300° C. Furthermore, during the nitriding operation, and particularly after the nitriding has progressed for some time, the temperatures can be raised well above the melting point of silicon as further assurance of the substantially complete conversion of the silicon to silicon nitride.

The ratio of silicon nitride bond to silicon carbide provided in the bonded silicon carbide articles made in accordance with the present invention is not critical and may vary considerably depending upon the type of article being fabricated and the particular combination of properties desired therein, and depending upon the specific use to which the article being formed is to be put. The silicon nitride bond may amount to as little as 5% of the finished article without departing from the spirit of the invention.

It is also desired to point out that modified silicon carbide bodies having a silicon nitride bond may be obtained in various ways by addition or substitution of other ingredients without departing from the spirit or scope of the present invention. For instance, a more plastic composition can be made by the addition of minor amounts of one or more clays to the mix. This modification is particularly applicable to the fabrication of more intricate shapes or of articles which are to be used at lower temperatures where high refractoriness is not desired. Similarly, silicon carbide bodies can be made according to the present invention, but in which a part of the silicon carbide grain, either the coarse or the fine fractions, is replaced by a refractory oxide, silicate, or spinel such as alumina, mullite, magnesia or the like.

Likewise, articles or bodies can be made in accordance with the present invention in which pore-forming materials are incorporated in the raw batch from which the body is made for the purpose of providing a greater degree of porosity in the final body. A pore-forming material, such as carbon or the like, which requires oxidation for removal from a body, would require a preliminary burning out of the pore-forming material at lower temperatures. Therefore, the pore-forming material preferably should be a material which is removed by volatilization during the drying and/or firing operation such as powdered or granular naphthalene, various organic resinous materials such as phenolic resins and the like or one which provides pores by reason of the generation of a gas. The resulting bodies, which have greater porosity than those made with no pore formers, are particularly useful in the fabrication of porous diffusion and filtering media, catalysts and catalyst carriers, insulation bodies and the like, whether in crushed granular form or in the form of molded shapes of predetermined contour.

The articles made in accordance with the present invention may be molded by any of the well-known methods including pressure molding, machine tamping, hand tamping, jolting, vibrational tamping, air hammer flat or edge tamping, or slip casting.

It is to be understood that the products of the present invention in its various modifications are not limited to any specific field or fields of use such as might be defined by the specific examples previously set forth. The products can be made in any desired shape as well as provided in granular or aggregate form. They are therefore not only suited for many of the uses for which industrial refractories are required, including bricks, blocks, setter tile, muffles, kiln furniture, and special shapes for application in and around furnaces and other high temperature equipment, but they are also well suited for many specialty high temperature applications, such as jet engine combustion chambers, linings for exhaust nozzles, rocket combustion chambers and exhaust nozzles, turbine blades, stator blades, lens fusion blocks, spark plug bodies, and the like. They are also suitable for the fabrication of laboratory ware, including combustion boats, crucibles, burner holders, and other shapes.

The resistance of such bodies to chemical attack makes them highly suitable for the making of articles used in the containing, conveying and handling of many acids, alkalies and other corrosive chemicals, including such articles as chambers and chamber linings, crucibles, pipes and pipe fittings, and other sundry shapes. The bodies of the present invention, particularly when modified by the use of pore formers in the raw batch from which the bodies are made, are also highly useful as diffusion and filtering media, such as diffusion tubes and plates, filtering tubes, plates and shapes, or as catalysts or catalyst carriers and supports.

Materials and articles of the present invention also can be made for abrasive purposes, such as grinding wheels, sharpening stones, razor hones, and other grinding and polishing shapes and materials. The dielectric properties make the present bodies useful in many articles in the electrical and radio industry including supports in electric light bulbs, radio tubes, X-ray tubes and radar equipment, resistors and grid leaks. Other miscellaneous uses include its use as thread guides, wire drawing dies, blasting nozzles, heating elements, and the like.

Having thus described the invention it is desired to claim:

1. A bonded silicon carbide article consisting essentially of granular silicon carbide and a silicon nitride bond in which substantially all the silicon of the bond is combined with nitrogen as silicon nitride having the chemical formula $Si_3N_4$, said article having a minimum modulus of rupture at 1350° C. of 2500 pounds per square inch, and being resistant to oxidation and heat shock.

2. A bonded silicon carbide article consisting essentially of granular silicon carbide and a silicon nitride bond in which substantially all the silicon of the bond is combined with nitrogen as silicon nitride having the chemical formula $Si_3N_4$, said article having a minimum modulus of rupture at 1450° C. of 2500 pounds per square inch, and being resistant to oxidation and heat shock.

3. A bonded silicon carbide article consisting essentially of granular silicon carbide and a silicon nitride bond in which substantially all of the silicon of the bond is combined with nitrogen as silicon nitride having the chemical formula $Si_3N_4$, said article retaining more than 50% of its cold strength at temperatures as high as 1450° C., having a resistance oxidation and heat shock materially in excess of that possessed by a similar article in which the silicon of the bond is not substantially completely nitrided and being resistant to oxidation at 1450° C.

4. A bonded silicon carbide article consisting essentially of granular silicon carbide and a silicon nitride bond, in which substantially all the silicon of the bond is combined with nitrogen as silicon nitride having the chemical formula $Si_3N_4$, said article being resistant to oxidation at 1450° C.

References Cited in the file of this patent

UNITED STATES PATENTS 866,444    Egly    Sept. 17, 1907

OTHER REFERENCES

J. W. Mellor: Comprehensive Treatise on Inorganic and Theoretical Chemistry, v. 8 (1928), pp. 115 and 117.